United States Patent
Jeong et al.

(10) Patent No.: US 10,853,158 B2
(45) Date of Patent: Dec. 1, 2020

(54) STORAGE DEVICE AND EVENT NOTIFICATION METHOD FOR STORAGE DEVICE

(71) Applicant: SAMSUNG ELECTRONICS CO., LTD., Suwon-si (KR)

(72) Inventors: Sungwon Jeong, Suwon-si (KR); Moonsang Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 15/454,985

(22) Filed: Mar. 9, 2017

(65) Prior Publication Data
US 2017/0286205 A1 Oct. 5, 2017

(30) Foreign Application Priority Data
Apr. 1, 2016 (KR) ........................ 10-2016-0040320

(51) Int. Cl.
| | | |
|---|---|---|
| *G06F 11/07* | (2006.01) | |
| *G06F 3/06* | (2006.01) | |
| *G06F 11/30* | (2006.01) | |
| *G06F 11/32* | (2006.01) | |
| *G06F 13/24* | (2006.01) | |

(52) U.S. Cl.
CPC ........ *G06F 11/0772* (2013.01); *G06F 3/0619* (2013.01); *G06F 3/0655* (2013.01); *G06F 3/0688* (2013.01); *G06F 11/073* (2013.01); *G06F 11/0727* (2013.01); *G06F 11/3034* (2013.01); *G06F 11/3037* (2013.01); *G06F 11/3051* (2013.01); *G06F 11/327* (2013.01); *G06F 13/24* (2013.01); *G06F 3/0659* (2013.01); *G06F 3/0679* (2013.01)

(58) Field of Classification Search
CPC .. G06F 11/2071; G06F 11/2089; G06F 3/067; G06F 3/0605
See application file for complete search history.

(56) References Cited

U.S. PATENT DOCUMENTS

| | | | |
|---|---|---|---|
| 5,457,694 A * | 10/1995 | Smith ................... | G06F 11/349 710/100 |
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,943,226 B1 | 1/2015 | Hoglund et al. | |
| 9,015,353 B2 | 4/2015 | Shapiro | |
| 9,015,477 B2 | 4/2015 | Giladi | |
| 2004/0083357 A1* | 4/2004 | Duncan ................. | G06F 9/4406 713/2 |
| 2008/0091915 A1* | 4/2008 | Moertl ................ | G06F 12/1081 711/206 |

(Continued)

*Primary Examiner* — Jigar P Patel
(74) *Attorney, Agent, or Firm* — Volentine, Whitt & Francos, PLLC

(57) ABSTRACT

An event notification method of a storage device includes detecting an event in the storage device, writing an asynchronous event information entry corresponding to the event in a completion queue of a host, and transmitting an interrupt corresponding to a transmission of the asynchronous event information entry to the host. The asynchronous event information entry is provided to the host regardless of reception of an asynchronous event request command from the host.

19 Claims, 12 Drawing Sheets

(56) References Cited

U.S. PATENT DOCUMENTS

| | | |
|---|---|---|
| 2010/0057966 A1* | 3/2010 | Ambikapathy ......... G06F 13/24 |
| | | 710/260 |
| 2010/0235711 A1* | 9/2010 | Kim ....................... G06F 11/10 |
| | | 714/755 |
| 2011/0233648 A1 | 9/2011 | Seol et al. |
| 2014/0173149 A1 | 6/2014 | Walker et al. |
| 2014/0215129 A1 | 7/2014 | Kuzmin et al. |
| 2014/0281040 A1 | 9/2014 | Liu |
| 2014/0331001 A1 | 11/2014 | Liu et al. |
| 2015/0186074 A1* | 7/2015 | Benisty ................. G06F 3/0659 |
| | | 711/115 |
| 2015/0261434 A1 | 9/2015 | Kagan et al. |
| 2016/0042810 A1* | 2/2016 | Lee .................... G11C 29/4401 |
| | | 714/723 |
| 2017/0123667 A1* | 5/2017 | Richter ................ G06F 3/0679 |

\* cited by examiner

STORAGE DEVICE AND EVENT NOTIFICATION METHOD FOR STORAGE DEVICE

CROSS-REFERENCE TO RELATED APPLICATIONS

A claim for priority under 35 U.S.C. § 119 is made to Korean Patent Application No. 10-2016-0040320, filed on Apr. 1, 2016, the disclosure of which is hereby incorporated in its entirety by reference.

BACKGROUND

The inventive concepts described herein relate to semiconductor memory devices, and more particularly, to storage devices and an event notification method for storage devices.

Flash memory devices are commonly used as audio and video data storage mediums of information devices such as for example computers, smart phones, PDAs, digital cameras, camcorders, voice recorders, MP3 players, handheld PCs, or the like. However, an erase operation must first be performed in advance to write data in a flash memory, and it may often occur that a unit of data erased is greater than a unit of data to be written. This characteristic, even in a case where a flash memory is used as an auxiliary memory device, may become a factor that hinders use of a file system for a general hard disk. This characteristic also suggests that a sequential input/output process with respect to a flash memory is more efficient than a non-sequential input/output process with respect to the flash memory.

A solid state drive (SSD) is a typical example of a flash memory-based large capacity storage device. As the demand for SSDs has recently grown, SSDs are now being used in diverse applications. For example, SSDs may be used as large capacity storage devices for servers, for clients and for data centers, among other various applications. An SSD interface should be capable of providing optimum speed and optimum reliability according to the particular use or intended application. SSD interfaces such as for example serial ATA (SATA), serial attached SCSI (SAS), or the like, are optimum SSD interfaces capable of satisfying such requirements. Recently, peripheral component interconnect express (PCIe)-based NVM express (NVMe) has been actively studied and applied as an interface.

A host device fitted with an SSD may include various computer systems. For example, an SSD may be connected to a server, a data center, or a personal computer. As such, various events may occur in the SSD. An SSD typically provides notification of event processing to a host responsive to a request by the host. However, a limitation of protocol whereby event notification is provided responsive to a host request is that it may be difficult to respond to various errors occurring in a device initialization stage (e.g., FTL Open Procedure) that is performed after the SSD is powered on.

SUMMARY

Embodiments of the inventive concept provide an event notification method of a storage device. The event notification method includes detecting an event in the storage device by a storage controller included in the storage device; writing an asynchronous event information entry corresponding to the event in a completion queue of a host; and transmitting an interrupt corresponding to a transmission of the asynchronous event information entry from the storage device to the host. The asynchronous event information entry is provided by the storage device to the host regardless of whether or not an asynchronous event request command has been received from the host.

Embodiments of the inventive concept also provide a storage device. The storage device includes a nonvolatile memory device; and a storage controller configured to control the nonvolatile memory device, detect an event in the storage and write an asynchronous event information entry corresponding to the detected event into a completion queue of a host regardless of whether or not an asynchronous event request command has been received from the host.

Embodiments of the inventive concept further provide a storage device including a nonvolatile memory device; and a storage controller configured to access the nonvolatile memory device responsive to commands from a host, detect occurrence of an event in the storage device, generate an asynchronous event information entry corresponding to the detected event, write the asynchronous event information entry in a completion queue of the host, and thereafter transmit an interrupt to the host. The storage controller is configured to detect the event independently without direction from the host.

BRIEF DESCRIPTION OF THE FIGURES

Embodiments of the inventive concept will be described hereinafter in more detail with reference to the accompanying drawings.

DETAILED DESCRIPTION

Figure 1:
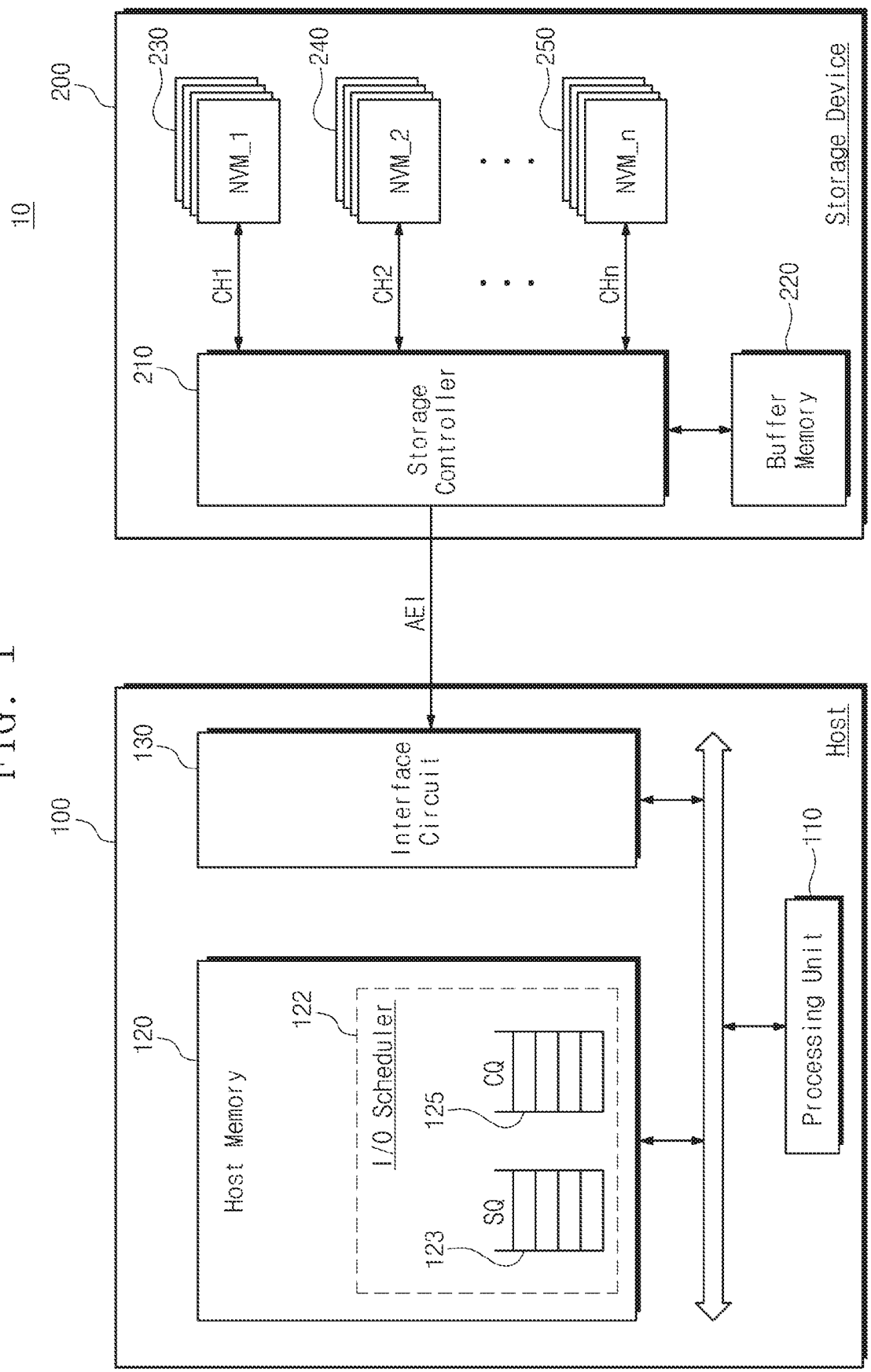
FIG. 1 illustrates a block diagram of a user device in accordance with an embodiment of the inventive concept.

Embodiments of inventive concept will be described more fully hereinafter with reference to the accompanying drawings. The inventive concept may, however, be embodied in many different forms and should not be construed as limited to the embodiments set forth herein. In the drawings, like numbers refer to like elements throughout.

As is traditional in the field of the inventive concept, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concept. Likewise, the blocks of the embodiments may be physically combined into more complex blocks without departing from the scope of the inventive concept.

FIG. 1 illustrates a block diagram of a user device in accordance with an embodiment of the inventive concept. Referring to FIG. 1, a user device 10 includes a host 100 and a storage device 200. In an embodiment of the inventive concept, the host 100 provides a command CMD (not shown) to the storage device 200. The storage device 200 writes a completion entry in a completion queue (CQ) of the host 100 and issues an interrupt as an execution result with respect to (or responsive to) the command In addition, when an event is detected in an arbitrary situation, the storage device 200 may transmit asynchronous event information to the host 100 even without having received a request from the host 100. That is, the storage device 200 may detect the arbitrary event independently without direction or command from the host 100, even in a case in which a request or command was not provided or received from the host 100.

The host 100 may write data in the storage device 200, or may read data stored in the storage device 200. The host 100 generates a command CMD for writing data in the storage device 200 or reading out data stored in the storage device 200. A normal command execution process of the host 100 may be as follows. The host 100 transmits a command CMD to the storage device 200, and the host 100 receives from the storage device 200 a completion entry directing whether or not to execute a corresponding command and also receives an associated interrupt. The host 100 performs an interrupt process for completing a thread or a task associated with the corresponding command in response to the interrupt.

As shown in FIG. 1, the host 100 includes a processing unit 110, a host memory 120, and an interface circuit 130 interconnected by a bus. An application program, a file system, a device driver, or the like may be loaded into the host memory 120. Various software for driving the host 100 may also be loaded into the host memory 120.

The processing unit 110 executes various software (e.g., an application program, an operating system, a device driver) loaded into the host memory 120. The processing unit 110 may execute an operating system and application programs. The processing unit 110 may be provided as a homogeneous multi-core processor or a heterogeneous multi-core processor.

An application program or data to be processed in the processing unit 110 may be loaded into the host memory 120. An input/output (I/O) scheduler 122 for managing a command queue of commands to be transmitted to the storage device 200 is loaded into the host memory 120. A submission queue (SQ) 123 and a completion queue (CQ) 125 are managed in the input/output scheduler 122. The submission queue 123 is a queue written by the host 100 and corresponds to commands to be transmitted to the storage device 200. The completion queue 125 is a queue of completion entries written by the storage device 200 and represents whether or not a command requested by the host 100 is completed.

Figure 2:
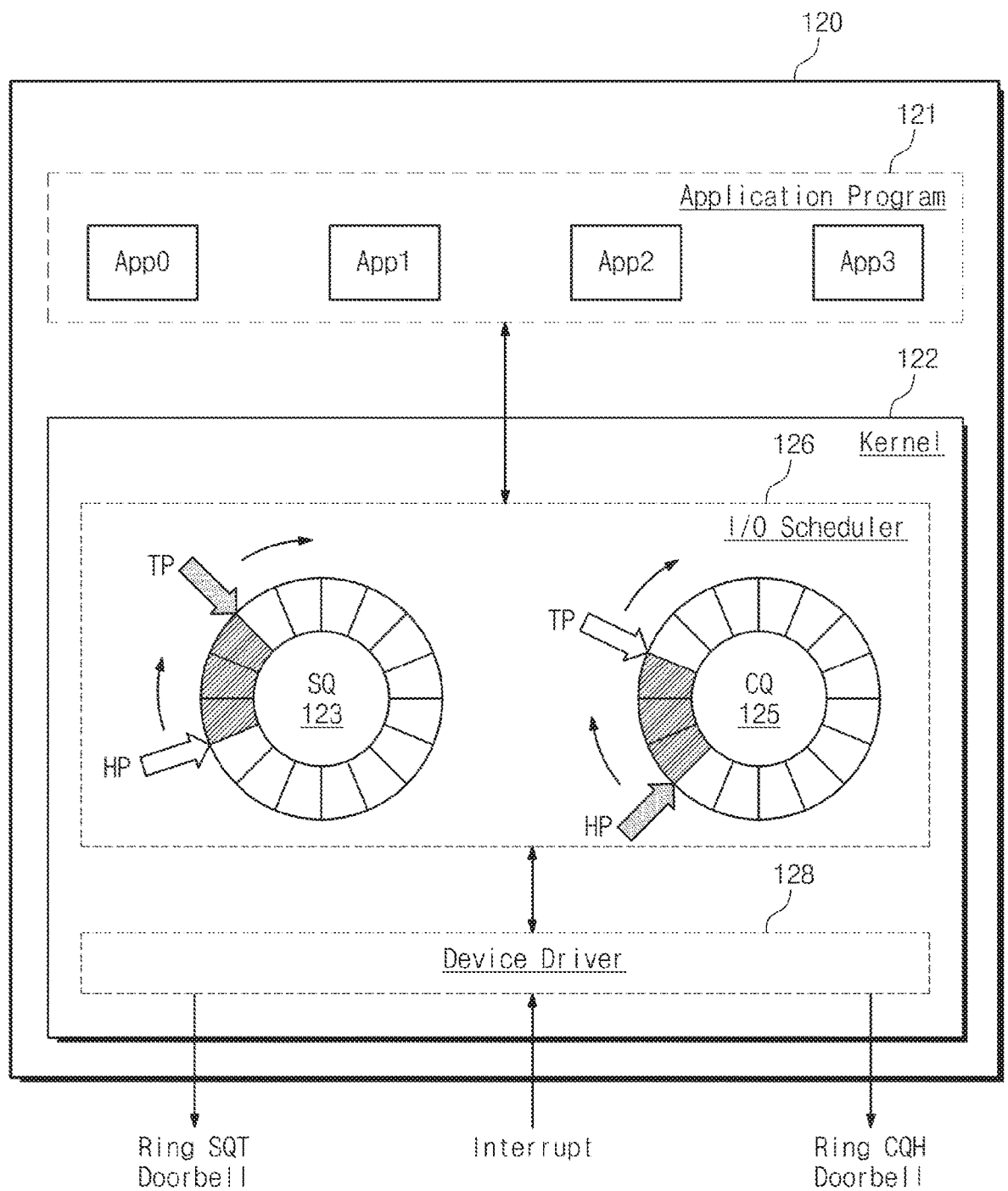
FIG. 2 illustrates a block diagram of a queue management operation of a host in accordance with an embodiment of the inventive concept.

The submission queue 123 is written or supplied by the host 100, and is consumed by the storage device 200. That is, the host 100 may write commands in the submission queue 123 and move a tail pointer (TP) of the submission queue 123 as the new commands are entered, and a location of a new tail pointer (TP) may be sent to the storage device 200. Similarly, the storage device 200 may move a head pointer (HP) of the submission queue 123 by providing completion entries to the completion queue 125. A tail pointer (TP) and a head pointer (HP) of the submission queue 123 are shown in FIG. 2 for example.

The completion queue 125 is written by the storage device 200 and is consumed by the host 100. That is, a tail pointer (TP) of the completion queue 125 may be moved by a write operation of the storage device 200. The host 100 may move a head pointer (HP) of the completion queue 125 in response to an interrupt, and a location of the new head pointer (HP) may be transmitted to the storage device 200. The transmission of the location of the new head pointer (HP) to the storage device 200 by the host 100 may be accomplished by writing the head pointer (HP) in a doorbell register (not illustrated) of the storage device 200. A tail pointer (TP) and a head pointer (HP) of the completion queue 125 are shown in FIG. 2 for example.

The interface circuit 130 provides a physical connection between the host 100 and the storage device 200. The interface circuit 130 converts a command, an address, data, etc. corresponding to various access requests issued from the host 100 into a protocol capable of interfacing with the storage device 200. A protocol of the interface circuit 130 may be at least one of universal serial bus (USB), small computer system interface (SCSI), peripheral component interconnect express (PCIe), ATA, parallel ATA (PATA), serial ATA (SATA), and serial attached SCSI (SAS) protocols. A case in which PCI express is the protocol of the interface circuit 130 will be described below.

The storage device 200 includes a storage controller 210, a buffer memory 220, and nonvolatile memory devices NVM_1 230, NVM_2 240, ... NVM_n 250 respectively connected to storage controller 210 via channels CH1, CH2, ... CHn. The storage device 200 may access nonvolatile memory devices 230, 240 and 250 or perform various requested operations in response to a command CMD provided from the host 100. The storage device 200 generates an interrupt signal by referring to a doorbell register (not shown) having content provided from the host 100 with respect to a completion queue (CQ). The storage device 200 can provide asynchronous event information (AEI) to the host 100 without having received a request (such as an asynchronous event request (AER)) provided from the host 100.

The storage controller 210 provides an interface between the host 100 and the storage device 200. Even though an asynchronous event request (AER) from the host 100 may not have been provided, the storage controller 210 can inform the host 100 of asynchronous event information (AEI) according to embodiments of the inventive concept. That is, even though an asynchronous event request (AER) command has not been transmitted from the host 100, if a predetermined event is detected, the storage controller 210 can transmit asynchronous event information (AEI) to the host 100. A detailed operation of the storage controller 210 will be described later.

Accordingly, in embodiments of the inventive concept, a storage device 200 may be provided which is capable of transmitting asynchronous event information (AEI) to the host 100 even without reception of an asynchronous event request (AER) command. Thus, the storage device 200 may inform the host 100 of an event occurrence even before an asynchronous event request (AER) command is issued from the host 100. The host 100 can also receive and process event information from the storage device 200 even though an asynchronous event request (AER) command has not been issued by the host 100.

FIG. 2 illustrates a block diagram of a queue management operation of a host in accordance with an embodiment of the inventive concept. Referring to FIG. 2, software of the host 100 loaded into the host memory 120 and driven by the processing unit 110 includes application programs 121 and a kernel 122 of the operating system (OS). The kernel 122 includes an input/output scheduler 126 and a device driver 128. Further, in other embodiments of the inventive concept, the kernel 122 of the operating system (OS) may also include a file system (not illustrated).

The application programs 121 are higher layer software driven as a basic service, or driven in the host 100 by a user request. A plurality of application programs APP0, APP1, APP2 and APP3 may be executed at the same time to provide various services. The application programs APP0, APP1, APP2 and APP3 may be loaded into the host memory 120 first, and then executed by the processing unit 110.

When a video file is requested to be played by a user, an application program (a video player) for playing the video is executed. Then, the executed application program may generate a read or write request that is to be transmitted to the storage device 200, the read or write request for playing a video file requested by a user. A command CMD for a read or write request to be transmitted to the storage device 200 may be written in the submission queue 123, and a tail pointer (TP) of the submission queue 123 may be updated. The host 100 transmits to the storage device 200 a tail doorbell notifying that a new command has been written in the submission queue 123. The storage device 200 may fetch a corresponding command from the submission queue 123 and execute the corresponding command.

The storage device 200 writes a completion entry in the completion queue 125 to notify completion of processing of a command most recently fetched from the host 100. In this case, as the completion entry is written, a tail pointer (TP) of the completion queue 125 increases. Subsequently, an interrupt corresponding to the corresponding completion entry may be transmitted from the storage device 200. Then the host 100 may perform an internal operation for completing all processing procedures with respect to the command written in the submission queue 123.

The device driver 128 is a control module in an operating system (OS) level of the host 100, and is for controlling the storage device 200. When a memory access request occurs as provided by a user or from the application programs 121, the device driver 128 is called out. The device driver 128 may be provided as a software module of a kernel for controlling the storage device 200.

Accordingly, embodiments of the inventive concept include a submission queue 123 in which a command generated by an application program and a plurality of commands are written, and a completion queue 125 which includes therein completion entries with respect to consumed commands written in the submission queue 123.

The host 100 can receive from the storage device 200 asynchronous event information (AEI) which is then written in the completion queue 125, even under a condition in which an asynchronous event request (AER) command has not been written in the submission queue 123. The storage device 200 may store asynchronous event information (AEI) in the completion queue 125 in the form of a completion entry. The host 100 may read the asynchronous event information (AEI) from the completion queue 125 and process the read asynchronous event information (AEI). The host 100 may write a completion queue head (CQH) doorbell in the storage device 200. The asynchronous event information (AEI) provided in the form of a completion entry by the writing of a completion queue head (CQH) doorbell may be removed.

Figure 3:
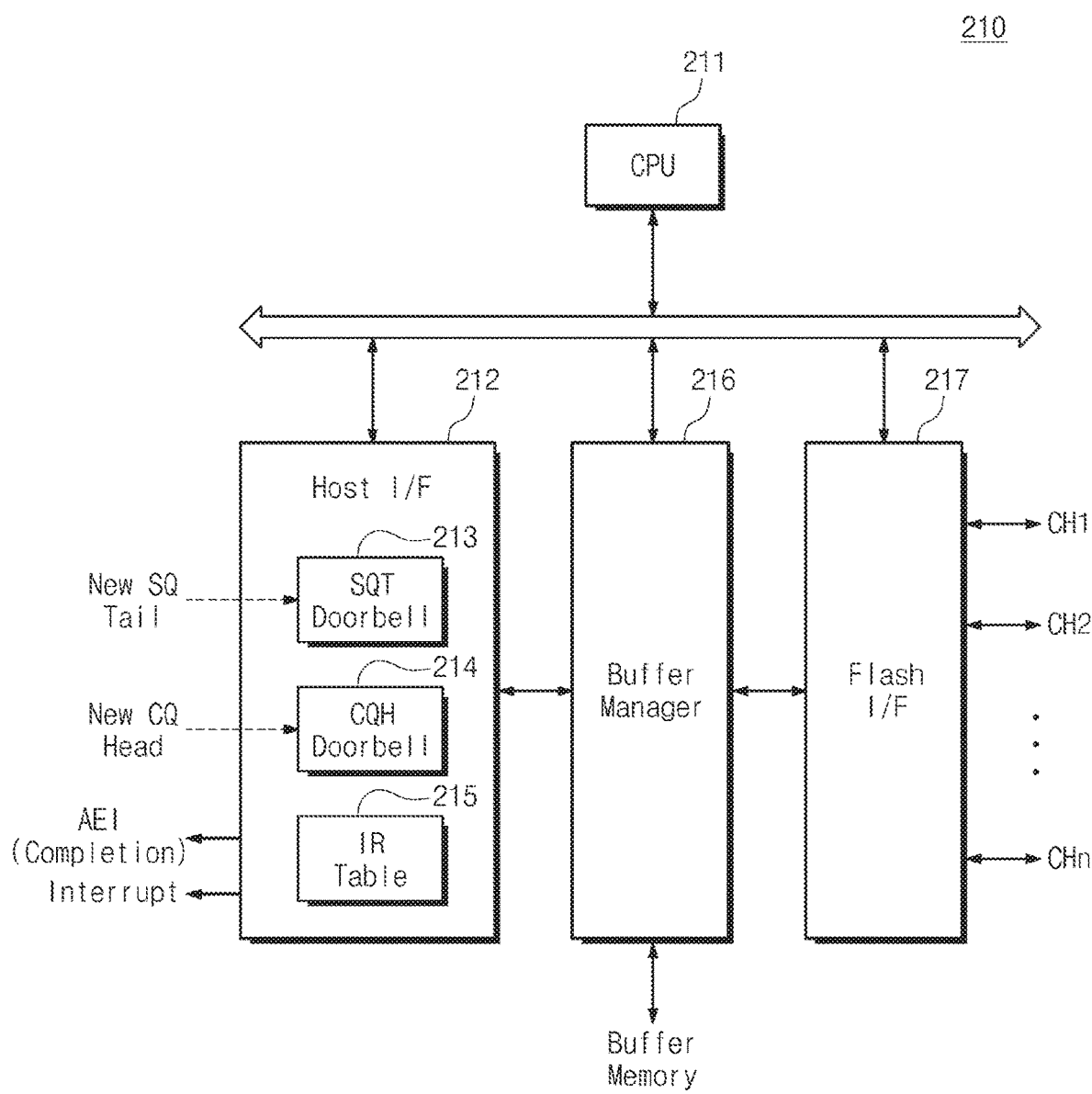
FIG. 3 illustrates a block diagram of a constitution of a storage controller illustrated in FIG. 1.

FIG. 3 illustrates a block diagram of a constitution of a storage controller illustrated in FIG. 1. Referring to FIG. 3, the storage controller 210 includes a central processing unit (CPU) 211, a host interface (IF) 212, a buffer manager 216, and a flash interface (IF) 217 interconnected by a bus.

The CPU 211 transmits various control information necessary for a read/write operation with respect to the nonvolatile memory devices 230, 240 and 250 to registers of the host interface 212 and the flash interface 217. The CPU 211 may operate according to firmware provided to perform various control operations of the storage controller 210. For example, the CPU 211 may execute a garbage collection for managing the nonvolatile memory devices 230, 240 and 250, or may execute a flash translation layer (FTL) for performing address mapping, wear leveling, or the like. When the storage device 200 is booted, a failure or an error in the open process of the flash translation layer (FTL) may occur before an asynchronous event request (AER) command is received from the host 100. In this case, it is difficult to inform the host 100 of event occurrence information.

The host interface 212 may perform a communication with the host 100. For example, the host interface 212 may include a first doorbell register (SQT doorbell) 213 for writing a tail pointer (TP) doorbell (new SQ tail) of the submission queue 123 of the host 100. The host interface 212 may include a second doorbell register (CQH doorbell) 214 in which the host 100 writes whether a head pointer (HP) (new CQ head) of the completion queue 125 is updated and writes a location of the updated head pointer (HP). The host interface 212 may include an interrupt (IR) table 215 that manages interrupts that may occur according to a condition of the second doorbell register 214.

The host interface 212 may write asynchronous event information (AEI) in the completion queue 125 of the host 100. The asynchronous event information (AEI) may be provided in the form of a completion entry. For example, in a situation such as booting of the storage device 200, it is assumed for the sake of illustration that the CPU 211 detects an error of hardware or software. It is assumed that at this time, an asynchronous event request (AER) command has not yet been received from the host 100. Subsequent to detection of the error, the CPU 211 writes the asynchronous event information (AEI) in the completion queue 125 of the host 100 regardless of whether or not the asynchronous event request (AER) command has been received. The asynchronous event information (AEI) may include the type of event that occurred, error information, a head number or ID of submission queue, a command ID, and other information.

The host interface 212 provides an interface with the storage device 200 in response to a bus format of the host 100. The bus format of the host 100 may include at least one of universal serial bus (USB), small computer system interface (SCSI), PCI express, ATA, parallel ATA (PATA), serial ATA (SATA), and serial attached SCSI (SAS) formats. An NVMe protocol may be applied to the host interface 212 in a case that the interface circuit 130 built in the host 100 exchanges data using PCI express.

The buffer manager 216 controls read and write operations of the buffer memory 220 (refer to FIG. 1). For example, the buffer manager 216 temporarily stores write data or read data in the buffer memory 220. The buffer manager 216 may divide a memory area of the buffer memory 220 in units of streams to manage the buffer memory 220 under control of the CPU 211.

The flash interface 217 exchanges data with the flash memory devices 230, 240 and 250. The flash interface 217 writes data transmitted from the buffer memory 220 in the flash memory devices 230, 240 and 250 via respective memory channels CH1, CH2, . . . CHn. The flash interface 217 collects read data provided from the flash memory devices 230, 240 and 250 through the memory channels CH1, CH2, . . . CHn. After that, the collected data may be stored in the buffer memory 220.

The storage controller 210 having such structure may provide asynchronous event information (AEI) to the host 100 regardless of doorbell information written in the first doorbell register 213 by the host 100.

Figure 4:
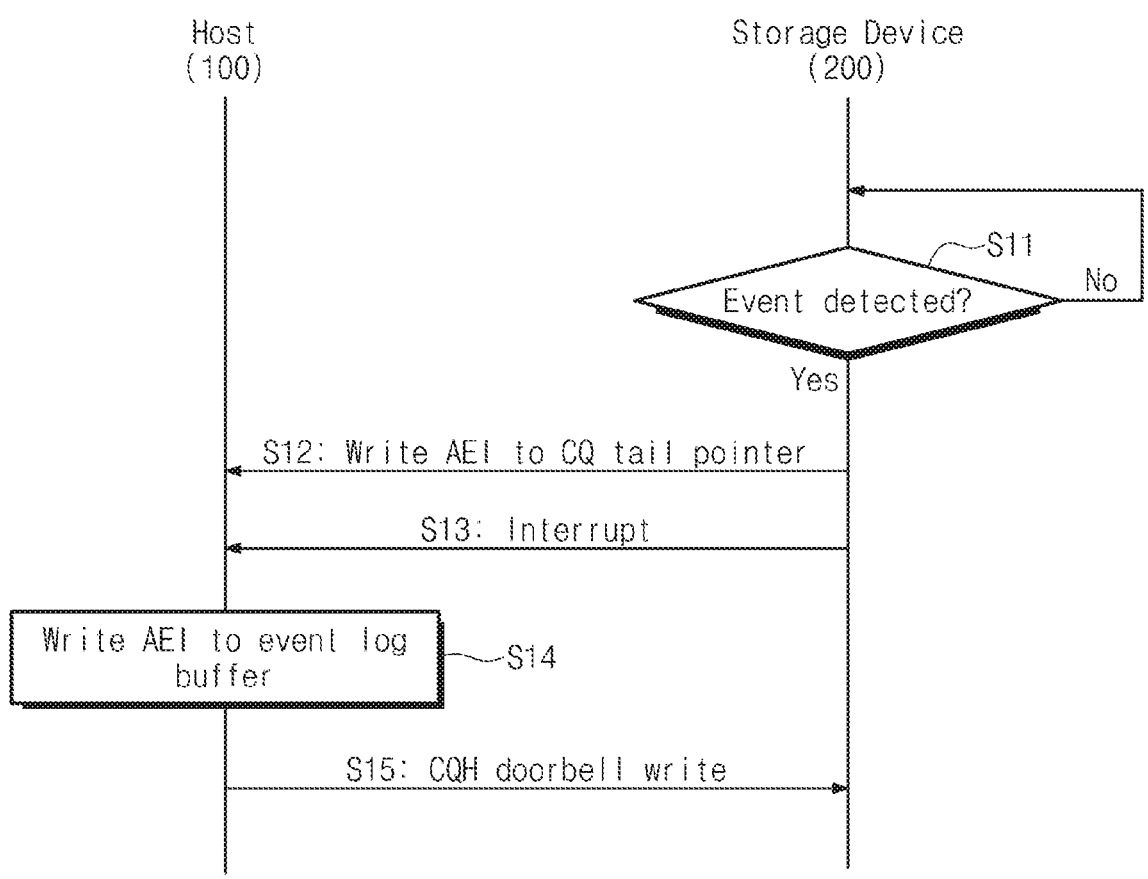
FIG. 4 illustrates a drawing explanatory of a method of exchanging asynchronous event information between a host and a storage device in accordance with an embodiment of the inventive concept.

FIG. 4 illustrates a drawing explanatory of a method of exchanging asynchronous event information between a host and a storage device in accordance with an embodiment of the inventive concept. Referring to FIG. 4, the storage device 200 can transmit asynchronous event information (AEI) to the host 100 without receiving any command from the host 100.

In operation S11, the storage device 200 detects occurrence of an event without any direction or request from the host 100. That is, the storage device 200 detects whether an event occurs even though an asynchronous event request (AER) command has not been written in the submission queue 123 of the host 100, even though a state transition of the first doorbell register 213 corresponding to the writing of the asynchronous event request (AER) command has not occurred, or without fetching of a command from the host 100. When occurrence of an event is not detected (No in S11), the storage device 200 loops back to operation S11 to continuously operates so as to detect occurrence of a next event. When occurrence of an event is detected (Yes in S11), the procedure proceeds to operation S12.

In operation S12, the storage device 200 writes asynchronous event information (AEI) in the completion queue 125 of the host 100. Then a tail pointer (TP) of the completion queue 125 (which may be a ring buffer) of the host 100 increases.

In operation S13, the storage device 200 transmits an interrupt to the host 100. In this case, an interrupt vector may be transmitted to have a value corresponding to at least one completion entry. The interrupt may be a pin-based signal and may be transmitted using a message signaled interrupt (MSI) method or a MSI-X method.

In operation S14, the host 100 stores asynchronous event information (AEI) in an event log buffer (not shown). The host 100 analyzes the asynchronous event information (AEI) stored in the event log buffer and performs processing with respect to the event according to an analyzed result. For example, when it is determined that a fatal error has occurred in the storage device 200, the host 100 may transmit an error message to a manager.

In operation S15, the host 100 writes a completion queue head (CQH) doorbell in the second doorbell register 214 of storage controller 210, notifying that processing with respect to the asynchronous event information (AEI) transmitted together with the interrupt is completed. That is, the host 100 writes the fact that a head pointer (HP) of the completion queue 125 corresponding to the asynchronous event information (AEI) is updated in the second doorbell register 214.

In the foregoing, a transmission process of asynchronous event information (AEI) between the host 100 and the storage device 200 has been described. The storage device 200 can transmit asynchronous event information (AEI) to the host 100 without receiving an asynchronous event request (AER) command from the host 100.

Figure 5:
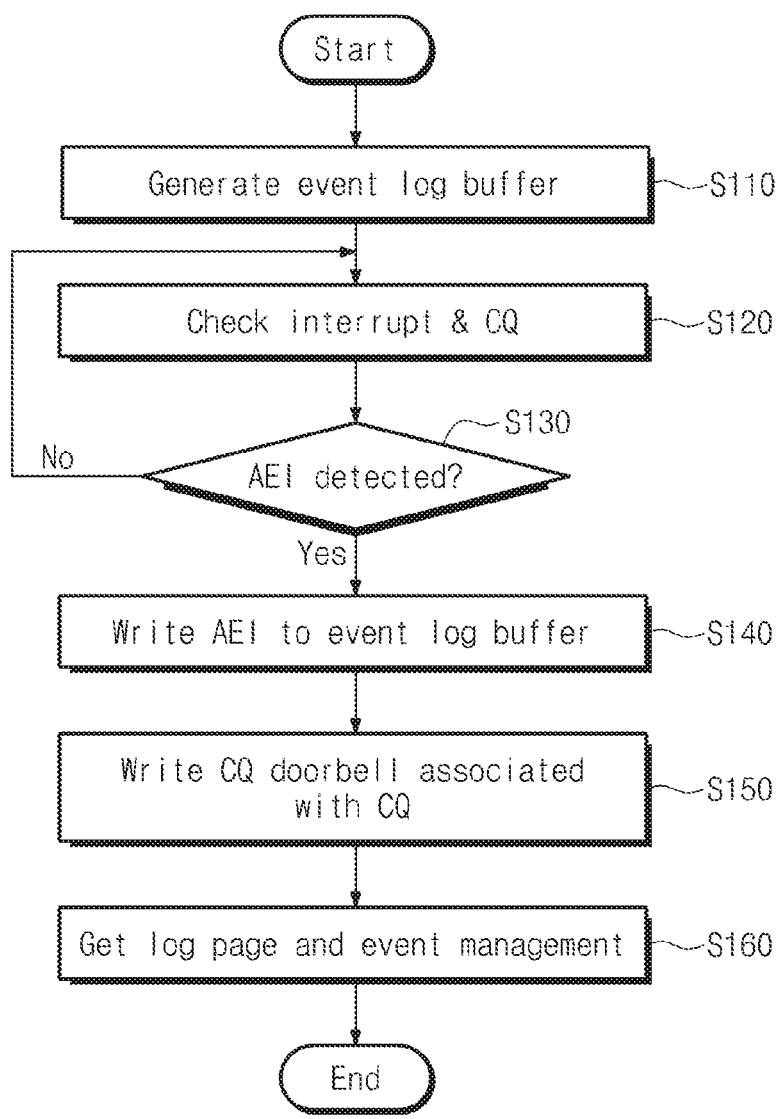
FIG. 5 illustrates a flowchart of an event processing method in a host in accordance with an embodiment of the inventive concept.

FIG. 5 illustrates a flowchart of an event processing method in a host in accordance with an embodiment of the inventive concept. Referring to FIG. 5, the host 100 can receive and process asynchronous event information (AEI) from the storage device 200 without issuing an asynchronous event request (AER) command.

In operation S110, the host 100 generates an event log buffer. The generation of the event log buffer for an event processing of the host 100 is only illustrative. The host 100 can process asynchronous event information (AEI) provided from the storage device 200 in various ways in other embodiments.

In operation S120, the host 100 checks whether an interrupt occurs in the storage device 200. The host 100 checks the completion queue 125 corresponding to the transmitted interrupt and determines whether information written in the completion queue 125 is asynchronous event information (AEI).

In operation S130, the host 100 performs a branch operation depending on whether the transmitted interrupt corresponds to the asynchronous event information (AEI). When the information written in the completion queue 125 is not asynchronous event information (AEI) (No in S130), the procedure returns to operation S120. When the information written in the completion queue 125 is asynchronous event information (AEI) (Yes in S130), the procedure proceeds to operation S140.

In operation S140, the host 100 stores the asynchronous event information (AEI) in the event log buffer. The asynchronous event information (AEI) stored in the event log buffer will be described later in detail with reference to FIG. 7.

In operation S150, the host 100 records a value representing that asynchronous event information (AEI) is received in the second doorbell register 214 of the storage device 200. The second doorbell register 214 stores a response of the host 100 associated with the asynchronous event information (AEI) written in the completion queue 125.

In operation S160, the host 100 obtains information stored in a log page of the event log buffer and analyzes the obtained information. According to a result of the analysis, the host 100 performs a process for handling an event (event management) that has occurred in the storage device 200. For example, an error message may be displayed on a display of user device 10 or may be provided to a manager in various ways.

Accordingly, functions of the host 100 in embodiments of the inventive concept include the capability of receiving asynchronous event information (AEI) from the storage device 200 without the necessity of transmitting an asynchronous event request (AER) to the storage device 200.

Figure 6:
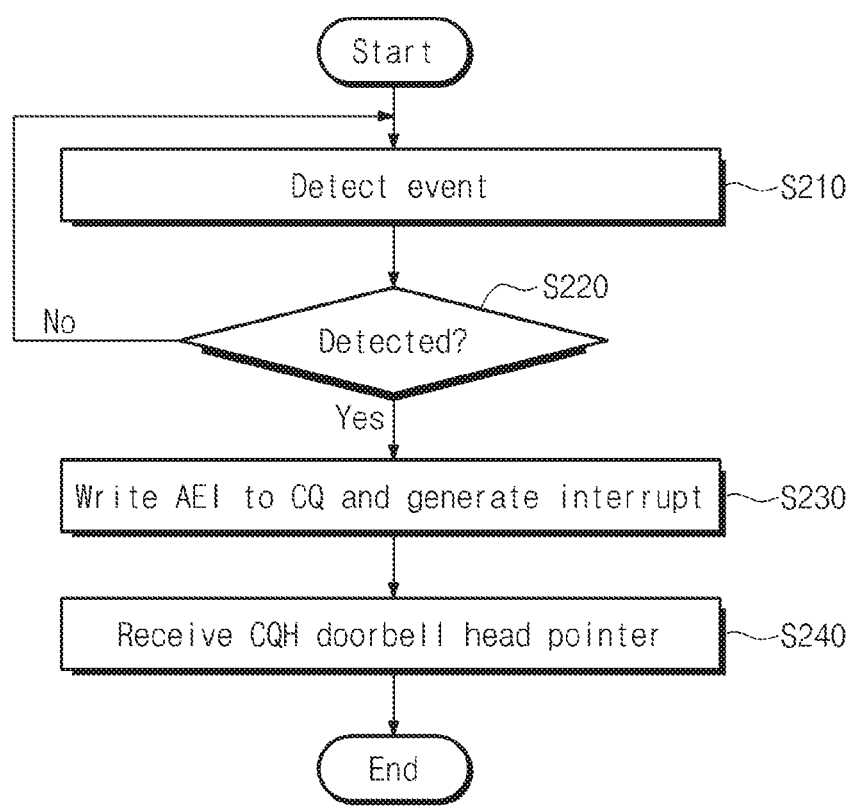
FIG. 6 illustrates a flowchart of a method of operating a storage device in accordance with an embodiment of the inventive concept.

FIG. 6 illustrates a flowchart of a method of operating a storage device in accordance with an embodiment of the inventive concept. Referring to FIG. 6, the storage controller 210 of the storage device 200 as shown in FIGS. 1 and 3 transmits indication of a detection of an event and asynchronous event information (AEI) to the host 100, without the necessity of fetching an asynchronous event request (AER) command from the host 100.

In operation S210, the storage controller 210 detects various events without direction from the host 100. That is, the storage controller 210 may detect various events independently without direction or command from the host 100. For example, in a booting operation of the storage device 200, the storage controller 210 can detect an event such as a hardware error, a software error, or a booting failure even before receiving the asynchronous event request (AER) command.

In operation S220, the storage controller 210 performs a branch operation depending on a detection result of the event. If an event such as a hardware error, a software error, or a booting failure for example is not detected in the storage controller 210 (No in S220), the procedure returns to operation S210. If a predetermined type of error or a hardware problem such as a hardware error, a software error, or a booting failure for example is detected in the storage controller 210 (Yes in S220), the procedure proceeds to operation S230.

In operation S230, the storage controller 210 writes the asynchronous event information (AEI) in the completion queue 125 of the host 100. This procedure is an operation of writing the asynchronous event information (AEI) in the completion queue 125 even without first receiving a head pointer SQHP of the submission queue 123, an identifier SQID, and a command ID. That is, the storage controller 210 writes an asynchronous event information (AEI) entry in the completion queue 125 of the host 100. As a result, a tail pointer (TP) of the completion queue 125 of the host 100 increases. Subsequently, the storage controller 210 transmits an interrupt to the host 100. The interrupt may be a pin-based signal and may be transmitted using a message signal-based interrupt (MSI) method or a MSI-X method.

In operation S240, a completion queue head (CQH) doorbell is written in the second doorbell register 214 of the storage device 200 by the host 100. The host 100 may update the second doorbell register 214 to write a fact that a head pointer (HP) of the completion queue 125 corresponding to asynchronous event information (AEI) has been updated and to write a location of the updated head pointer (HP).

Accordingly, in embodiments of the inventive concept an operation method of the storage controller 210 includes transmitting asynchronous event information (AEI) to the host 100 without having received an asynchronous event request (AER) command.

Figure 7:
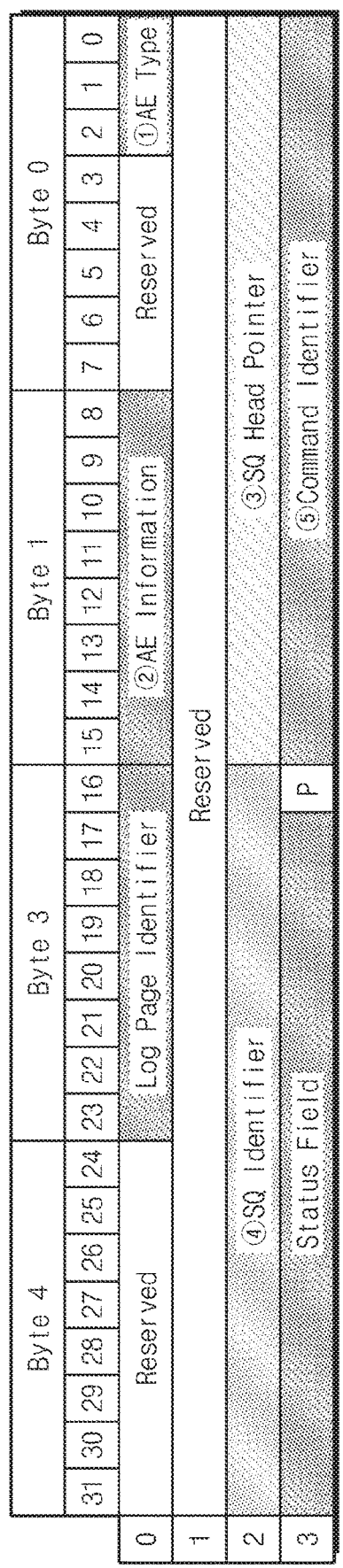
FIG. 7 illustrates a table of an entry configuration of asynchronous event information in accordance with an embodiment of the inventive concept.

FIG. 7 illustrates a table of an entry configuration of asynchronous event information (AEI) according to an embodiment of the inventive concept. Referring to FIG. 7, asynchronous event information (AEI) written in the completion queue 125 of the host 100 will be described by way of illustration. However, the entry configuration of asynchronous event information (AEI) described with respect to FIG. 7 is only illustrative and many modifications of the entry configuration are possible.

For example, the asynchronous event information (AEI) entry according to an embodiments of the inventive concept may include at least five pieces or types of information. The asynchronous event information (AEI) entry may include ① an asynchronous event type (AE type), ② asynchronous event information (AE information), ③ a submission queue head pointer (SQHP), ④ a submission queue identifier (SQID), ⑤ a command identifier.

The asynchronous event type (AE type) includes type information of an event detected by the storage controller 210. For example, the asynchronous event type (AE type) may represent whether the detected event is an error state or a state associated with a SMART (self-monitoring, analysis and reporting technology)/health. The asynchronous event type (AE type) may for example be set to field values such as shown in Table 1 below.

TABLE 1

| Value | Definition |
|---|---|
| 0 h | Error status |
| 1 h | SMART/Health status |
| 2 h | Notice |
| 3 h~5 h | Reserved |
| 6 h | I/O Command Set specific status |
| 7 h | Vendor specific |

That is, an asynchronous event type (AE type) having a field value of '0h' may mean for example that the event is an occurrence of an error. An asynchronous event type (AE type) having a field value of '1h' may for example mean that a problem has occurred in a reliability test (e.g., SMART/Health). An asynchronous event type (AE type) having a field value of '2h' may mean for example that a property of namespace of the storage device 200 has changed. An asynchronous event type (AE type) having a field value of '3h-5h' may for example correspond to a reserved field. An asynchronous event type (AE type) having a field value of '6h' may for example represent a specific state. An asynchronous event type (AE type) having a field value of '7*h*' may for example be defined as a vendor specific value.

Detected information of an error state may be stored in the asynchronous event information field of the asynchronous event information (AEI) entry. For example, using a bit value of the asynchronous event information (AEI) field, the storage device 200 may inform the host 100 that a diagnostic error, a permanent error, or a transient error has been detected. Information representing that a firmware load has failed may also be included in the asynchronous event information (AEI) field. An error may be detected in a booting operation of the storage device 200 before receiving an asynchronous event request (AER) command. This error may be a device open error and information about the device open error may be transmitted through asynchronous event information (AEI) field. For example, the device open error may be defined as '6h' which is a reserved area of the asynchronous event information (AEI) field.

The submission queue head pointer (SQHP), the submission queue identifier (SQID), and the command identifier are values associated with a command fetched from the submission queue 123 of the host 100. However, an asynchronous event information entry has to be generated in the storage controller 210 without an asynchronous event request (AER) command from the host 100. Thus, the submission queue head pointer (SQHP), the submission queue identifier (SQID), and the command identifier may be set to the maximum value 'FFFFh' among defined values of the field. For example, in the case where values of the submission queue head pointer (SQHP), the submission queue identifier (SQID), and the command identifier of the asynchronous event information (AEI) entry have a field value of 'FFFFh', it may be understood that the asynchronous event information (AEI) was written in the completion queue 125 by the storage device 200 responsive to a detected event and not responsive to an asynchronous event request (AER) command transmitted from the host 100. In the case where it is checked that information (SQHP, SQID, Command ID) of asynchronous event information (AEI) entry written in the completion queue 125 has the field value 'FFFFh', the host 100 may recognize that the information (SQHP, SQID, Command ID) has been transmitted to the host without the asynchronous event request (AER) command.

In the case where the host 100 needs more detailed event information, the host 100 may refer to a log page identifier stored in sixteenth through $23^{rd}$ bits of the asynchronous event information (AEI) entry. The host 100 may then request a log page corresponding to the log page identifier from the storage device 200.

Figure 8:
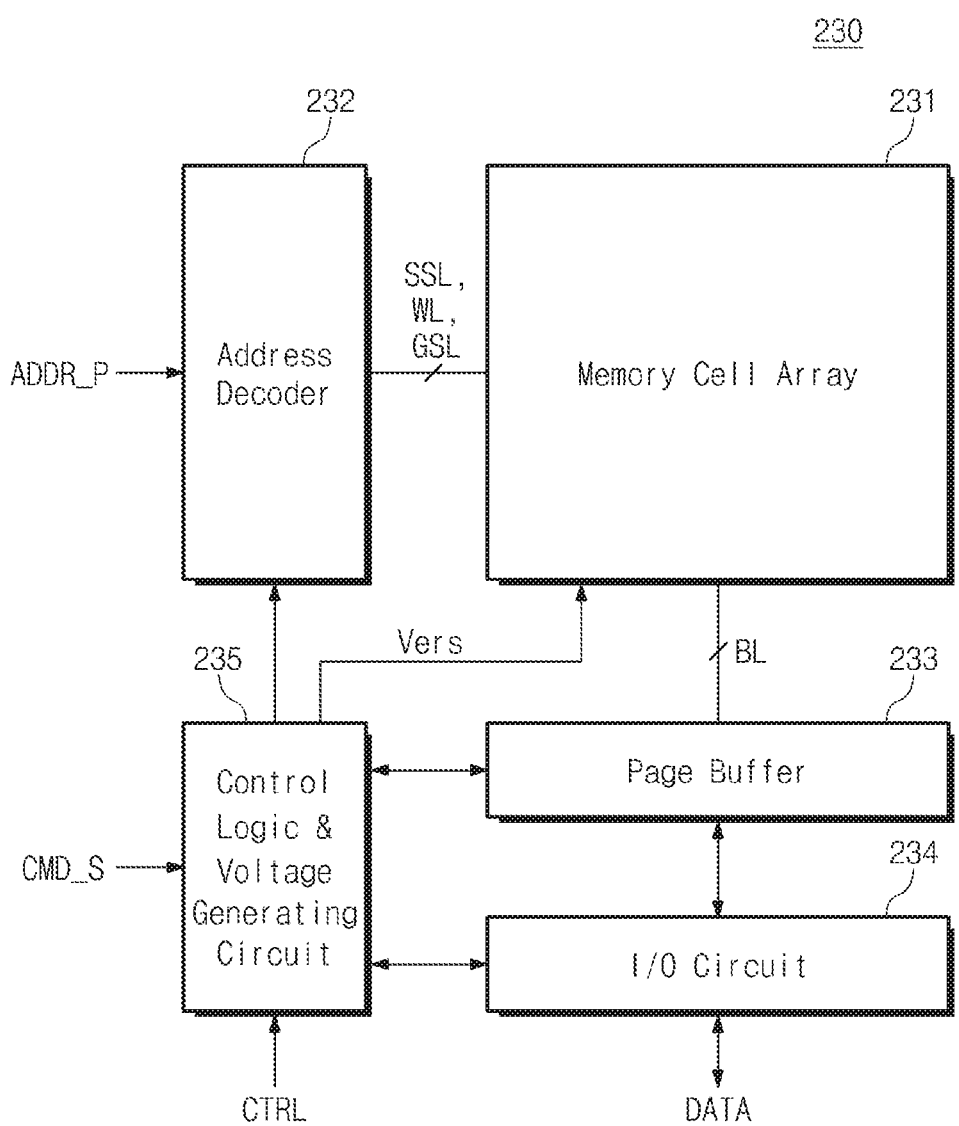
FIG. 8 illustrates a block diagram of a constitution of a nonvolatile memory shown in FIG. 1.

FIG. 8 illustrates a block diagram of a constitution of a nonvolatile memory shown in FIG. 1. Referring to FIG. 8, the nonvolatile memory 230 includes a memory cell array 231, an address decoder 232, a control logic and voltage generating circuit 235, a page buffer 233, and an input/output (I/O) circuit 234.

The memory cell array 231 may include a plurality of memory blocks. Each of the memory blocks may include a plurality of cell strings. Each of the cell strings may include a plurality of memory cells. The plurality of memory cells may be connected to a plurality of word lines WL. Each of the memory cells may include a single level cell (SLC) storing 1 bit or a multi level cell (MLC) storing at least 2 bits.

In an embodiment of the inventive concept, the memory cell array 231 may be provided as a three dimensional (3D) memory array. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure as the memory cells and being formed monolithically together with the memory cells.

The following patent documents, which are hereby incorporated by reference, describe suitable configurations for three-dimensional memory arrays, in which the three-dimensional memory array is configured as a plurality of levels, which word lines and/or bit lines shared between levels: U.S. Pat. Nos. 7,679,133; 8,553,466; 8,654,587; 8,559,235; and US Pat. Pub. No. 2011/0233648.

The address decoder 232 is connected to the memory cell array 231 through a plurality of word lines WL, string select lines SSL, and ground select lines GSL. The address decoder 232 may receive a physical address ADD (ADDR_P) from an external device (e.g., the device controller 110), decode the received physical address ADD, and drive the plurality of word lines WL. For example, the address decoder 232 may decode a physical address ADD received from an external device, select at least one word line of the plurality of word lines WL based on the decoded physical address ADD, and drive the at least one selected word line.

The control logic and voltage generating circuit 235 may receive a storage command CMD (CMD_S) and a control signal CTRL from an external device, and may control the address decoder 232, the page buffer 233, and the input/output circuit 234 in response to the received signals. For example, in response to the signals (CMD, CTRL), the control logic and voltage generating circuit 235 may control other constituent elements such that data DATA is stored in the memory cell array 231. In response to the signals (CMD, CTRL), the control logic and voltage generating circuit 235 may control other constituent elements such that data DATA stored in the memory cell array 231 is transmitted to an external device.

The page buffer 233 is connected to the memory cell array 231 through a plurality of bit lines BL. The page buffer 233 may control bit lines BL such that data DATA received from the input/output circuit 234 is stored in the memory cell array 231 under the control of the control logic and voltage generating circuit 235. The page buffer 233 may read data stored in the memory cell array 231 and transmit the read data to the input/output circuit 234 under the control of the control logic and voltage generating circuit 235. The page buffer 233 may receive data from the input/output circuit 234 in units of pages or read data from the memory cell array 231 in units of pages.

The input/output circuit 234 may receive data DATA from an external device and transmit the received data DATA to the page buffer 233. The input/output circuit 234 may also receive data DATA from the page buffer 233 and transmit the received data DATA to the external device. The input/output circuit 234 may transmit/receive data DATA to/from the external device in synchronization with a control signal CTRL.

The control logic and voltage generating circuit 235 may generate various voltages required when the nonvolatile memory 230 operates. For example, the control logic and voltage generating circuit 235 may generate various voltages such as a plurality of program voltages, a plurality of pass voltages, a plurality of select read voltages, a plurality of unselect read voltages, a plurality of erase voltages, and a plurality of verify voltages. The control logic and voltage generating circuit 235 may provide the generated various voltages (indicated generally as Vers) to the memory cell array 231, and/or may provide various generated voltages to the address decoder 232.

Figure 9:
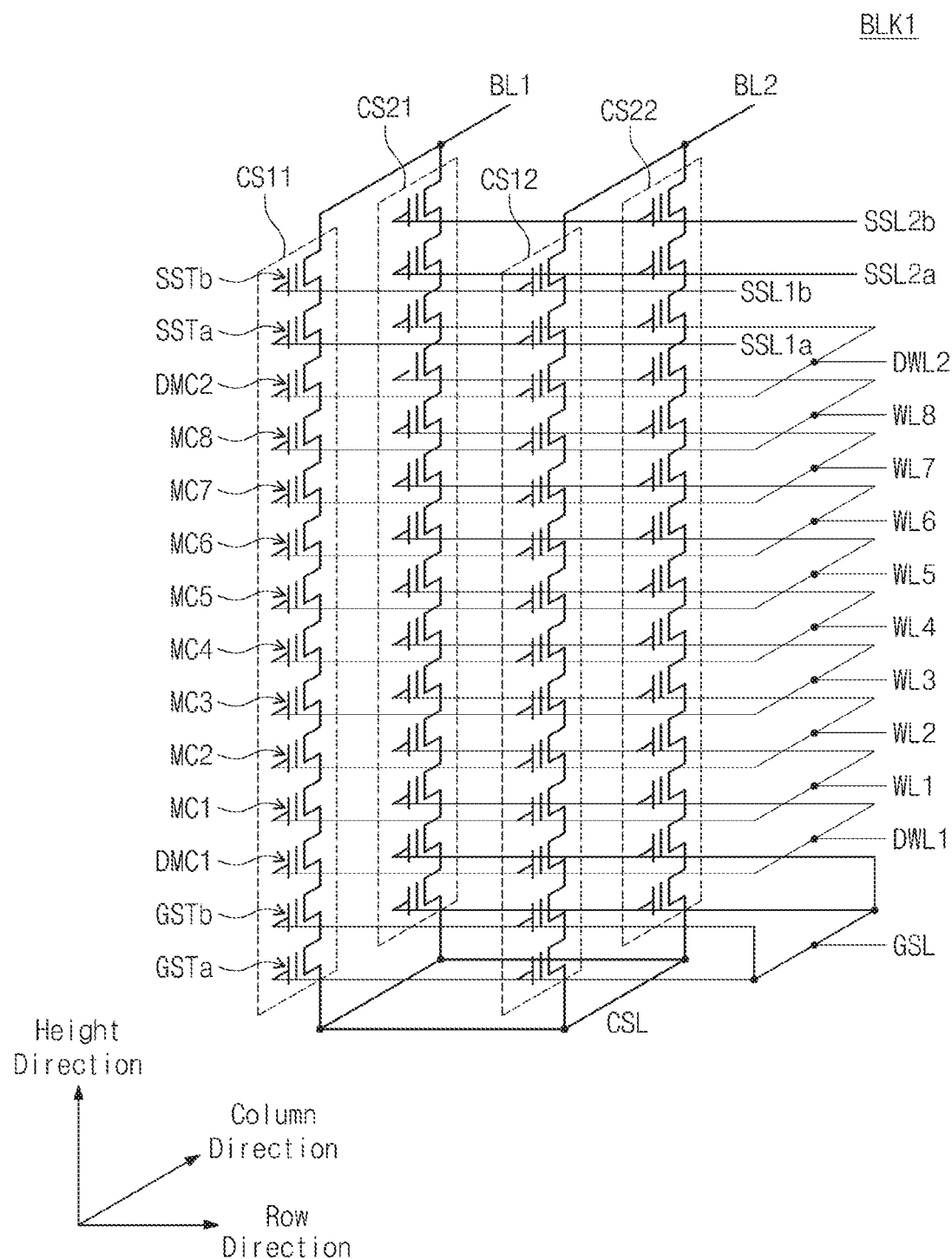
FIG. 9 illustrates a circuit diagram of an example of a first memory block among memory blocks included in a memory cell array of FIG. 8.

FIG. 9 illustrates a circuit diagram of an example of a first memory block among memory blocks included in a memory cell array of FIG. 8. A first memory block BLK1 having a three-dimensional structure is described with reference to FIG. 9. However, the inventive concept is not limited thereto memory blocks having the structure described with respect to FIG. 9. Other memory blocks included in the memory cell array 231 may have a structure similar to the first memory block BLK1.

Referring to FIG. 9, the first memory block BLK1 includes a plurality of cell strings (CS11, CS12, CS21, CS22). The cell strings (CS11, CS12, CS21, CS22) may be arranged along a row direction and a column direction to form rows and columns.

For example, the cell strings CS11 and CS12 may be connected to string select lines SSL1a and SSL1b to form a first row. The cell strings CS21 and CS22 may be connected to string select lines SSL2a and SSL2b to form a second row.

The cell strings CS11 and CS22 may be connected to a first bit line BL1 to form a first column. The cell strings CS12 and CS22 may be connected to a second bit line BL2 to form a second column.

Each of the cell strings (CS11, CS12, CS21, CS22) includes a plurality of cell transistors. For example, each of the cell strings (CS11, CS12, CS21, CS22) may include string select transistors SSTa and SSTb, a plurality of memory cells MC1~MC8, ground select transistors GSTa and GSTb, and dummy memory cells DMC1 and DMC2.

Each of the cell transistors included in the cell strings (CS11, CS12, CS21, CS22) may be a charge trap flash (CTF) memory cell. The memory cells MC1~MC8 are serially connected and are laminated in a height direction perpendicular to a plane formed by a row direction and a column direction. The string select transistors SSTa and SSTb are serially connected and are provided between the memory cells MC1~MC8 and the bit line BL. The ground select transistors GSTa and GSTb are serially connected and are provided between the memory cells MC1~MC8 and a common source line CSL.

A first dummy memory cell DMC1 may be provided between the memory cells MC1~MC8 and the ground select transistors GSTa and GSTb. A second dummy memory cell DMC2 may be provided between the memory cells MC1~MC8 and the string select transistors SSTa and SSTb.

The ground select transistors GSTa and GSTb of the cell strings (CS11, CS12, CS21, CS22) may be connected to a ground select line GSL. Ground select transistors of the same row may be connected to the same ground select line and ground select transistors of different rows may be connected to different ground select lines (not shown). For example, first ground select transistors GSTa of the cell strings CS11 and CS12 of the first row may be connected to a first ground select line, and second ground select transistors GSTb of the cell strings CS21 and CS22 of the second row may be connected to a second ground select line.

Although not illustrated in the drawing, ground select transistors provided at the same height from a substrate (not illustrated) may be connected to the same ground select line, and ground select transistors provided at different heights from the substrate (not illustrated) may be connected to different ground select lines. For example, the first ground select transistors GSTa of the cell strings (CS11, CS12, CS21, CS22) may be connected to the first ground select line and the second ground select transistors GSTb of the cell strings (CS11, CS12, CS21, CS22) may be connected to the second ground select line.

Memory cells located at the same height from the substrate or the ground select transistors GSTa and GSTb, may be connected to the same word line in common, and memory cells located at different heights from the substrate or the ground select transistors GSTa and GSTb may be connected to different word lines. For example, the first through eighth memory cells MC1~MC8 may be connected to respective first through eight word lines WL1~WL8 in common.

String select transistors of the same row among the first string select transistors SSTa of the same height may be connected to the same string select line, and string select transistors of different rows among the first string select transistors SSTa of the same height may be connected to different string select lines. For example, the first string select transistors SSTa of the cell strings CS11 and CS12 of the first row may be connected to the string select line SSL1a in common, and the first string select transistors SSTa of the cell strings CS21 and CS22 of the second row may be connected to the string select line SSL2a in common.

Similarly, string select transistors of the same row among the second string select transistors SSTb of the same height may be connected to the same string select line, and string select transistors of different rows among the second string select transistors SSTb of the same height may be connected to different string select lines. For example, the second string select transistors SSTb of the cell strings CS11 and CS12 of the first row may be connected to the string select line SSL1b in common, and the second string select transistors SSTb of the cell strings CS21 and CS22 of the second row may be connected to the string select line SSL2b in common.

Although not illustrated in the drawing, string select transistors of cell strings of the same row may be connected to the same string select line in common. For example, the first and second string select transistors SSTa and SSTb of the cell strings CS11 and CS12 of the first row may be connected to the same string select line in common. The first and second string select transistors SSTa and SSTb of the cell strings CS21 and CS22 of the second row may be connected to the same string select line in common.

Dummy memory cells of the same height may be connected to the same dummy word line and dummy memory cells of different heights may be connected to different dummy word lines. For example, the first dummy memory cells DMC1 may be connected to a first dummy word line DWL1, and the second dummy memory cells DMC2 may be connected to a second dummy word line DWL2.

Read and write operations may be performed in units of rows in the first memory block BLK1. For example, a row of the memory block BLK1 may be selected by the string select lines SSL1a, SSL1b, SSL2a and SSL2b.

When a turn-on voltage is supplied to the string select lines SSL1a and SSL1b and a turn-off voltage is supplied to the string select lines SSL2a and SSL2b, the cell strings CS11 and CS12 of the first row are connected to the bit lines BL1 and BL2. When a turn-on voltage is supplied to the string select lines SSL2a and SSL2b and a turn-off voltage is supplied to the string select lines SSL1a and SSL1b, the cell strings CS21 and CS22 of the second row are connected to the bit lines BL1 and BL2. Memory cells of the same height among memory cells of a cell string of a row driven by driving a word line may be selected. Read and write operations may be performed in the selected memory cells. The selected memory cells may form a physical page unit.

An erase operation may be performed in units of blocks in the first memory block BLK1. When an erase operation is performed in units of blocks, all the memory cells MC of the first memory block BLK1 may be erased at the same time according to an erase request. When an erase operation is performed in units of sub-blocks, a part of the memory cells MC of the first memory block BLK1 may be erased at the same time according to an erase request and the remaining memory cells MC may be erase-prohibited. A low voltage (e.g., a ground voltage) is supplied to a word line connected to memory cells being erased and a word line connected to the erase-prohibited memory cells may be floated.

The first memory block BLK1 illustrated in FIG. 9 is illustrative, and the number of cell strings may increase or decrease, and the number of rows and columns formed by the cell strings may increase or decrease depending on the number of the cell strings. The number of cell transistors such as GST, MC, DMC and/or SST of the first memory block BLK1 may increase or decrease, and a height of the first memory block BLK1 may increase or decrease depending on the number of cell transistors. The number of lines GSL, WL, DWL and/or SSL connected to the cell transistors may increase or decrease depending on the number of the cell transistors.

Figure 10:
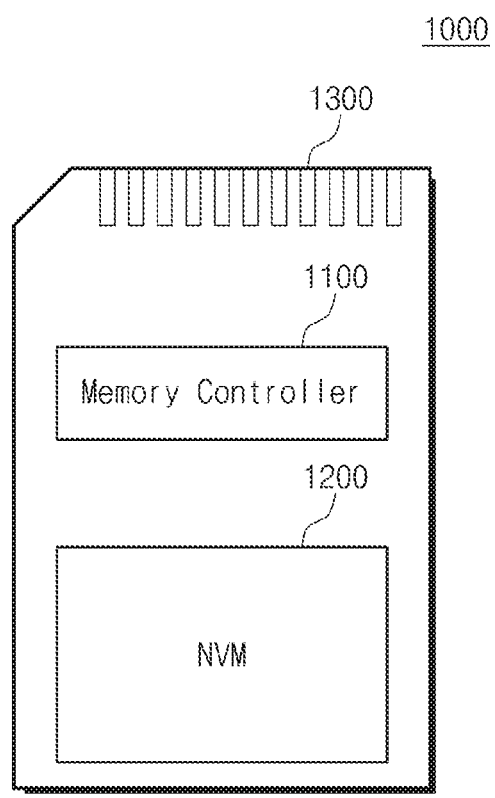
FIG. 10 illustrates a block diagram of a memory card system that provides asynchronous event information to a host in accordance with an embodiment of the inventive concept.

FIG. 10 illustrates a block diagram of a memory card system that may provide asynchronous event information (AEI) to a host in accordance with an embodiment of the inventive concept. Referring to FIG. 10, the memory card system 1000 includes a memory controller 1100, a nonvolatile memory 1200, and a connector 1300.

Although not specifically shown in FIG. 10, the memory controller 1100 is connected to the nonvolatile memory (NVM) 1200. The memory controller 1100 is configured to access to the nonvolatile memory 1200. For example, the memory controller 1100 is configured to control read, write, erase and background operations of the nonvolatile memory 1200. The background operations include operations such as wear level management, garbage collection, or the like. The memory controller 1100, based on the method described with reference to FIGS. 1 through 8, may transmit asynchronous event information (AEI) to a host without receiving an asynchronous event request (AER) command from the host.

The memory controller 1100 is configured to provide an interface between the nonvolatile memory 1200 and the host. The memory controller 1100 is configured to drive firmware for controlling the nonvolatile memory 1200. The memory controller 1100 may include constituent elements such as for example a random access memory (RAM), a processing unit, a host interface, a memory interface, an error correction unit, or the like.

The memory controller 1100 may communicate with an external device through the connector 1300. The memory controller 1100 may communicate with an external device (e.g., host) according to a specific communication protocol. The memory controller 1100 is configured to communicate with an external device through at least one of various communication protocols such as for example universal serial bus (USB), Multi-Media Card™ (MMC), embedded MMC (eMMC), peripheral component interconnection (PCI), PCI-express (PCI-E), advanced technology attachment (ATA), serial-ATA, parallel-ATA, small computer small interface (SCSI), enhanced small disk interface (ESDI), integrated drive electronics (IDE), Firewire™, universal flash storage (UFS), mobile industry processor interface (MIPI®), nonvolatile memory-express (NVMe) protocols, or the like. The write command defined by the above-mentioned communication protocols may include size information of write data.

The nonvolatile memory 1200 may be implemented with various nonvolatile memory devices such as for example electrically erasable and programmable ROM (EPROM), NAND flash memory, NOR flash memory, phase-change RAM (PRAM), resistive RAM (ReRAM), ferroelectric RAM (FRAM), spin torque magnetic RAM (STT-MRAM), or the like.

The memory controller 1100 and the nonvolatile memory 1200 may be integrated into one semiconductor device. The memory controller 1100 and the nonvolatile memory 1200 may be integrated into one semiconductor device to constitute a solid state drive (SSD). The memory controller 1100 and the nonvolatile memory 1200 may be integrated into one semiconductor device to constitute a memory card. For example, the memory controller 1100 and the nonvolatile memory 1200 may be integrated into one semiconductor device to constitute a memory card such as a personal computer memory card international association (PCM-CIA), a CompactFlash® (CF) card, a smart media card (SM, SMC), a memory stick, a Multi-Media Card™ (MMC, RS-MMC, MMCmicro, eMMC), a Security Digital™ card (SD, miniSD, microSD, SDHC), a universal flash memory device (UFS), or the like.

Figure 11:
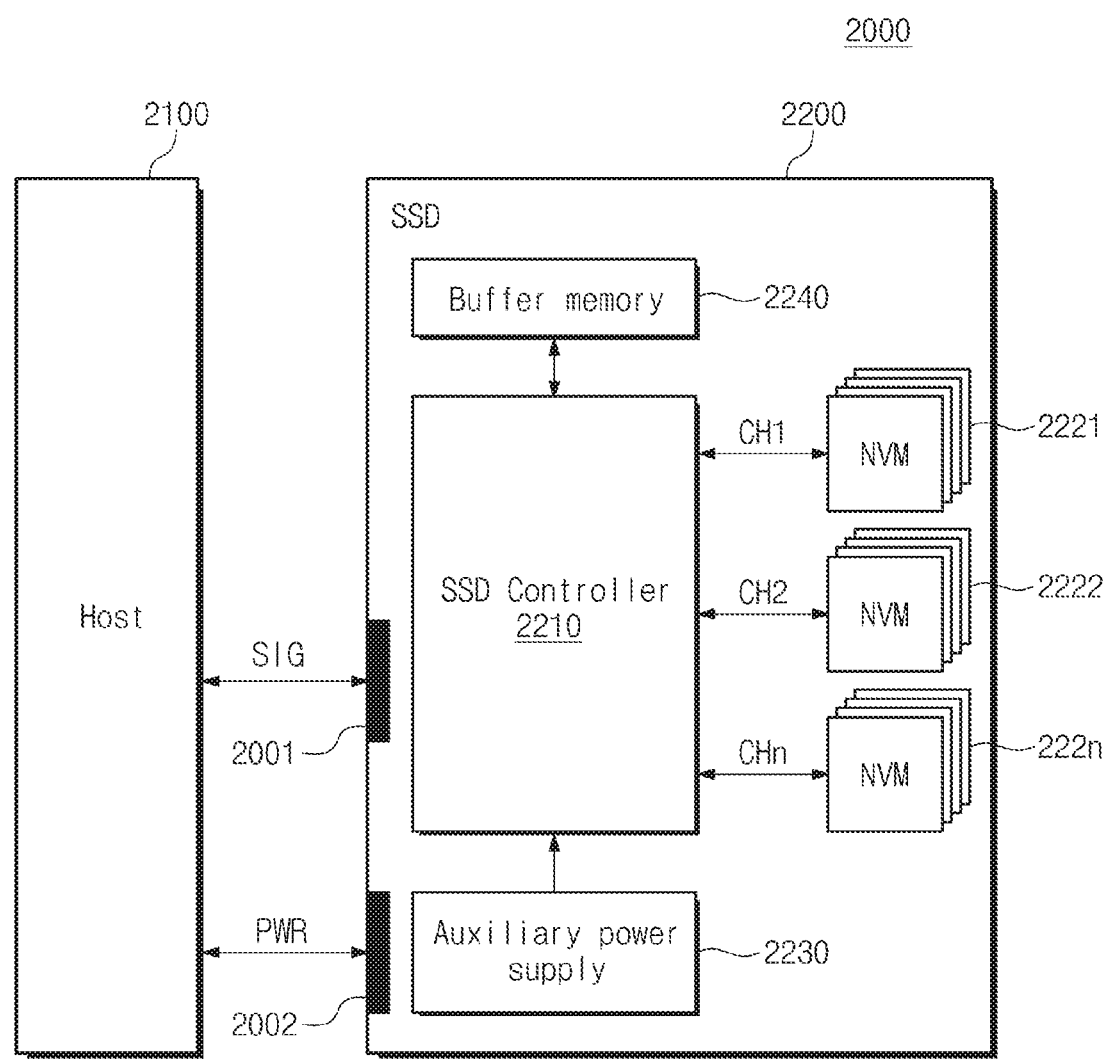
FIG. 11 illustrates a block diagram of a solid state drive (SSD) system including a nonvolatile memory system in accordance with an embodiment of the inventive concept.

FIG. 11 illustrates a block diagram of a solid state drive (SSD) system including a nonvolatile memory system in accordance with an embodiment of the inventive concept. Referring to FIG. 11, the SSD system 2000 includes a host 2100 and a SSD 2200. The SSD 2200 may exchange a signal SIG with the host 2100 through a signal connector 2001 and may be supplied with power PWR through a power connector 2002. The SSD 2200 includes a SSD controller 2210, a plurality of flash memories (NVM) 2221~222n connected to the SSD controller 2210 via channels CH1, CH2 and CHn, an auxiliary power supply device 2230, and a buffer memory 2240.

The SSD controller 2210 may control the flash memories 2221~222n in response to a signal received from the host 2100. The SSD controller 2210 may operate based on the method described with reference to FIGS. 1 through 8. The SSD controller 2210 may transmit asynchronous event information (AEI) to the host 2100 without receiving an asynchronous event request (AER) command from the host 2100.

The auxiliary power supply device 2230 is connected to the host 2100 through the power connector 2002. The auxiliary power supply device 2230 may receive power PWR from the host 2100 to be charged. In the case where a power supply from the host 2100 is not sufficient, the auxiliary power supply device 2230 may provide a power supply of the SSD system 2000. The auxiliary power supply device 2230 may be located inside or outside the SSD 2200. For example, the auxiliary power supply 2230 may be located on a main board and may provide auxiliary power to the SSD 2200.

The buffer memory 2240 operates as a buffer memory of the SSD 2200. For example, the buffer memory 2240 may temporarily store data received from the host 2100, data received from the flash memories 2221~222n, or meta data (e.g., mapping table) of the flash memories 2221~222n. The buffer memory 2240 may include for example a volatile memory such as a DRAM, a SDRAM, a double data rate (DDR) SDRAM, a low power double data rate (LPDDR) SDRAM, a SRAM, or the like, or a nonvolatile memory such as for example a FRAM, a ReRAM, a STT-MRAM, a PRAM, or the like.

Figure 12:
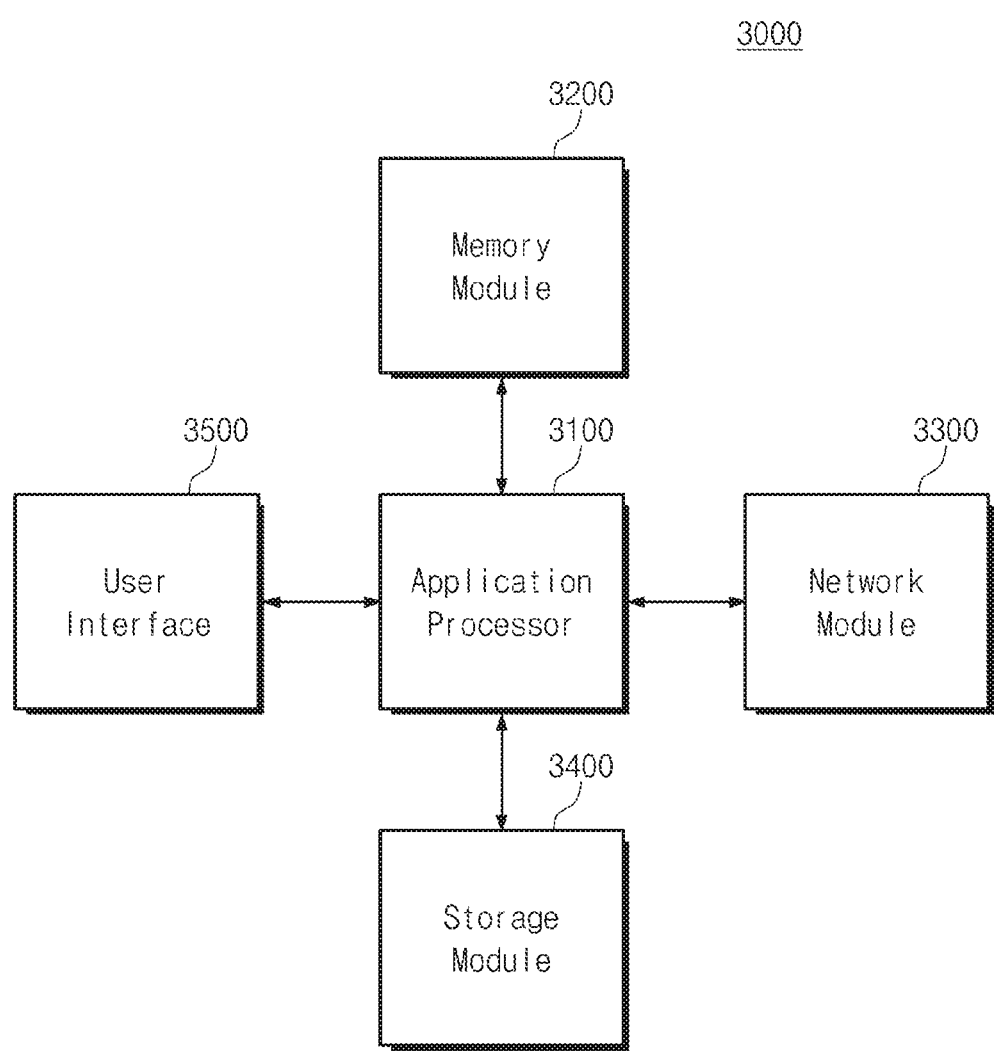
FIG. 12 illustrates a block diagram of a user system including a nonvolatile memory system in accordance with an embodiment of the inventive concept.

FIG. 12 illustrates a block diagram of a user system including a nonvolatile memory system in accordance with an embodiment of the inventive concept. Referring to FIG. 12, the user system 3000 includes an application processor 3100, a memory module 3200, a network module 3300, a storage module 3400, and a user interface 3500.

The application processor 3100 may drive constituent elements and an operating system (OS) included in the user system 3000. The application processor 3100 may include interfaces, a graphic engine, and controllers that control constituent elements included in the user system 3000. The application processor 3100 may be provided as a system-on-chip (SoC).

The memory module 3200 may operate as a main memory, an operation memory, a buffer memory, or a cache memory of the user system 3000. The memory module 3200 may include a volatile random access memory such as for example DRAM, SDRAM, DDR SDRAM, DDR2 SDRAM, DDR3 SDRAM, LPDDR SDRAM, LPDDR2 SDRAM, LPDDR3 SDRAM, or the like, or a nonvolatile random access memory such as for example PRAM, ReRAM, MRAM, FRAM, or the like.

The network module 3300 may perform a communication with external devices. The network module 3300 may support a wireless communication such as for example code division multiple access (CDMA), global system for mobile communication (GSM), wideband CDMA (WCDMA), CDMA-2000, time division multiple access (TDMA), long term evolution (LTE™), Wimax, WLAN, ultra-wideband (UWB), blue tooth, wireless display (WI-DI), or the like. The network module 3300 may be included in the application processor 3100.

The storage module 3400 can store data. For example, the storage module 3400 may store data received from the application processor 3100. The storage module 3400 may transmit data stored in the storage module 3400 to the application processor 3100. The storage module 3400 can be embodied by a nonvolatile semiconductor memory device such as for example a phase-change RAM (PRAM), a magnetic RAM (MRAM), a resistive RAM (RRAM), a NAND flash, a NOR flash, a three-dimensional NAND flash, or the like.

The storage module 3400 may operate according to the method descried with reference to FIGS. 1 through 8. The storage module 3400 may communicate with the application processor 3100 based on the predetermined interface. That is, the storage module 3400 may transmit asynchronous event information (AEI) to the application processor 3100 without receiving an asynchronous event request (AER) command from the application processor 3100.

The user interface 3500 may include interfaces that input data or a command into the application processor 3100, or output data to an external device. The user interface 3500 may include user input interfaces such as for example a keyboard, a keypad, a button, a touch panel, a touch screen, a touch pad, a touch ball, a camera, a microphone, a gyroscope sensor, a vibration sensor, a piezoelectric element, or the like. The user interface 3500 may include user output interfaces such as for example a liquid crystal display (LCD), an organic light emitting diode (OLED) display, an active matrix OLED (AMOLED) display, a LED, a speaker, a motor, or the like.

According to embodiments of the inventive concept, a storage device can notify a host of an event occurrence even without having received a request from the host. Thus, the storage device can notify the host of an event occurrence even before an event notification request occurs in the host, or even in a situation where an event notification cannot be requested from the host. Thus, check performance of the host with respect to an event occurrence in the storage device can be improved.

The above-disclosed subject matter should be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An event notification method of a storage device comprising:
   detecting an event in the storage device by a storage controller included in the storage device;
   writing an asynchronous event information entry corresponding to the detected event in a completion queue of a host; and
   after the writing of the asynchronous event information entry, transmitting an interrupt corresponding to a transmission of the asynchronous event information entry from the storage device to the host,
   wherein the asynchronous event information entry is provided by the storage device to the host responsive to the detected event and field values corresponding to the asynchronous event information entry are set to a value that is predetermined as indicative that the asynchronous event information entry was written in the completion queue responsive to the detected event and without reception of an asynchronous event request command from the host.

2. The event notification method of claim 1, wherein the asynchronous event information entry comprises asynchronous event detail information that represents a type of the detected event and a type of an error.

3. The event notification method of claim 2, wherein the type of the error comprises an error state and a state associated with self-monitoring, analysis and reporting technology (SMART)/Health.

4. The event notification method of claim 2, wherein the asynchronous event detail information comprises a device open error that occurs when the storage device is booted.

5. The event notification method of claim 1, wherein the host includes a submission queue, and the field values of the asynchronous event information entry that are set to the value that is predetermined are associated with a submission queue head pointer (SQHP), a submission queue identifier (SQID), and a command identifier.

6. The event notification method of claim 1, wherein the storage device is an NVMe interface-based solid state drive.

7. The event notification method of claim 1, wherein the storage device comprises a nonvolatile memory device including a three-dimensional memory array.

8. A storage device comprising:
   a nonvolatile memory device; and
   a storage controller configured to control the nonvolatile memory device, detect an event in the storage device, write an asynchronous event information entry corresponding to the detected event into a completion queue of a host responsive to the detected event without reception of an asynchronous event request command from the host, and transmit to the host an interrupt corresponding to the asynchronous event information entry written into the completion queue after writing the asynchronous event information entry into the completion queue,
   wherein field values corresponding to the asynchronous event information entry are set to a value that is predetermined as indicative that the asynchronous event information entry was written in the completion queue responsive to the detected event and without reception of the asynchronous event request command from the host.

9. The storage device of claim 8, wherein the storage controller comprises a host interface configured to write the asynchronous event information entry in the host and transmit the interrupt to the host.

10. The storage device of claim 9, wherein the host interface is configured to exchange information with the host according to an NVMe interface protocol.

11. The storage device of claim 8, wherein the asynchronous event information entry comprises a device open error field indicating an error detected during a booting operation of the storage device.

12. The storage device of claim 9, wherein the host includes a submission queue, and the field values of the asynchronous event information entry that are set to the value that is predetermined are associated with a submission queue head pointer (SQHP), a submission queue identifier (SQID), and a command identifier.

13. The storage device of claim 12, wherein the field values of the submission queue head pointer (SQHP), the submission queue identifier (SQID), and the command identifier are respectively set to a maximum value.

14. The storage device of claim 8, wherein the nonvolatile memory device comprises a three-dimensional memory array.

15. A storage device comprising:
a nonvolatile memory device; and
a storage controller configured to access the nonvolatile memory device responsive to commands from a host, detect occurrence of an event in the storage device, generate an asynchronous event information entry corresponding to the detected event, write the asynchronous event information entry in a completion queue of the host, and thereafter transmit an interrupt to the host, wherein the storage controller is configured to detect the event and write the asynchronous event information entry in the completion queue of the host independently without direction from the host, and field values corresponding to the asynchronous event information entry are set to a value that is predetermined as indicative that the asynchronous event information entry was written in the completion queue responsive to the detected event and without reception of an asynchronous event request command from the host.

16. The storage device of claim 15, wherein the detected event comprises a hardware error, a software error or a booting failure during a booting operation of the storage device.

17. The storage device of claim 15, wherein the storage controller is configured to exchange information with the host according to an NVMe interface protocol.

18. The storage device of claim 15, wherein the nonvolatile memory device comprises a three-dimensional memory array.

19. The storage device of claim 15, wherein the host includes a submission queue, and the field values of the asynchronous event information entry that are set to the value that is predetermined are associated with a submission queue head pointer (SQHP), a submission queue identifier (SQID), and a command identifier.

* * * * *